Nov. 11, 1952

N. FELICI

2,617,976

ELECTROSTATIC MACHINE

Filed Jan. 17, 1950

INVENTOR
Noël Felici

By George Harvey

ATTORNEY

Nov. 11, 1952 N. FELICI 2,617,976
ELECTROSTATIC MACHINE
Filed Jan. 17, 1950 6 Sheets-Sheet 4

Fig. 5

INVENTOR
Noël Felici
By
George H. Carey
ATTORNEY

Fig. 6

Patented Nov. 11, 1952

2,617,976

UNITED STATES PATENT OFFICE 2,617,976

ELECTROSTATIC MACHINE

Noël Felici, Grenoble, France, assignor to Centre National de la Recherche Scientifique, Paris, France, a corporation of France Application January 17, 1950, Serial No. 138,986
In France January 21, 1949

17 Claims. (Cl. 322—2)

In electrostatic generators or motors with conductive members as built heretofore the variation of the potential of the conveyors is obtained through moving the conveyors in the electric field created by the inductors. This method, while having the merit of simplicity, generally does not make it possible to submit the conveyors to the maximum electric forces consistent with their "main frame area" as defined in the patent to Noel Felici 2,486,140, issued October 25, 1949, and with the dielectric strength of the surrounding dielectric fluid. This results in a loss of power with respect to that which would be obtained if the conveyors were always subjected to these maximum forces, and this loss is more particularly important in machines of the Toepler type where it reaches and even exceeds 50%.

The invention has for its object to provide means for increasing the electrostatic forces of "reaction," this means making it possible more particularly to increase in a large measure the power and the efficiency of electrostatic machines, especially those with conductive members of the Toepler type.

While in all the known electrostatic machines without any exception the variation of potential of the conveyors is obtained solely through the variation of an electrostatic influence without there being any conducting connection with the conveyors which maintains the potential and charge thereof, according to a fundamental characteristic feature of the invention an additional condition of potential is imposed upon the conveyors by means conductively connecting them with sources of electricity or an equivalent device.

For the reasons which will be hereinafter given, to this end the conveyors are successively put into connection with a plurality of sources the voltage of each of which is constant and differs from one source to the other in accordance with progressively stepped potentials taken across the sources or the poles of the respective generators.

In order that the above mentioned means may have their maximum efficiency it will be advisable that the preceding operation shall take place in as short a time as possible and that the means utilized shall occupy as little space as possible.

In order to facilitate the explanation of the method which forms the subject matter of the invention, several embodiments which illustrate the manner in which the invention may be carried out will be described herebelow, it being understood that these examples are in no way limitative.

Figure 1:
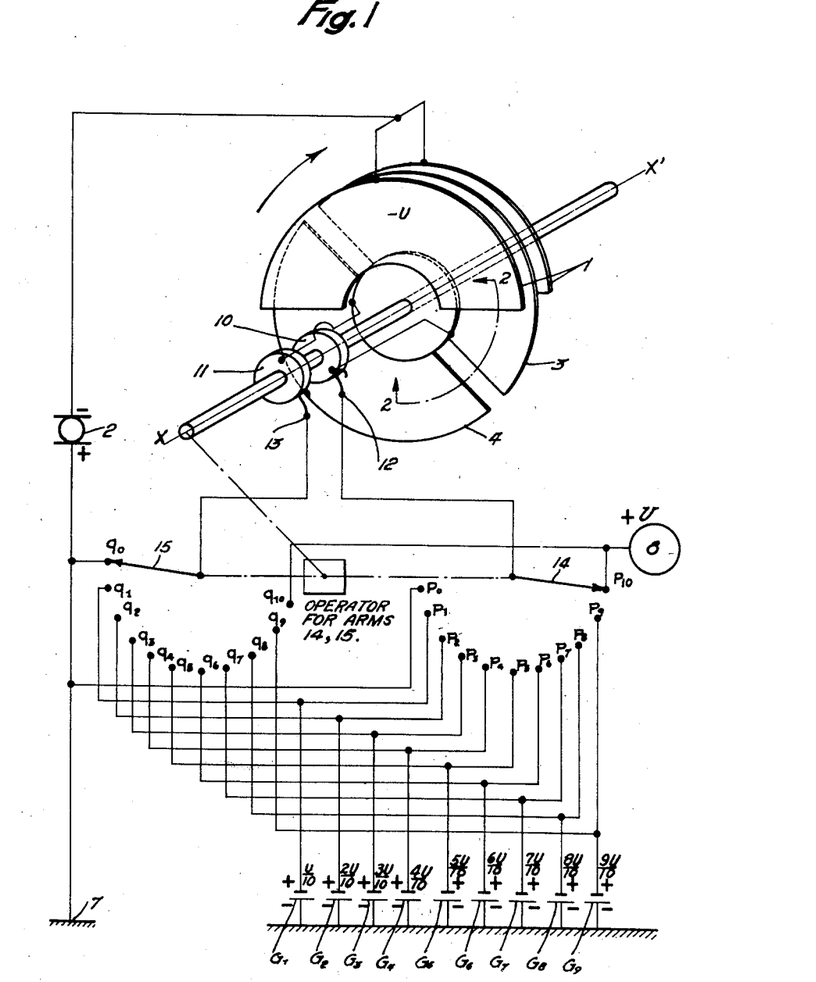
Fig. 1 is a diagrammatic view of a machine of the Toepler type after modification thereof in accordance with the invention.
Figures 2, 7:
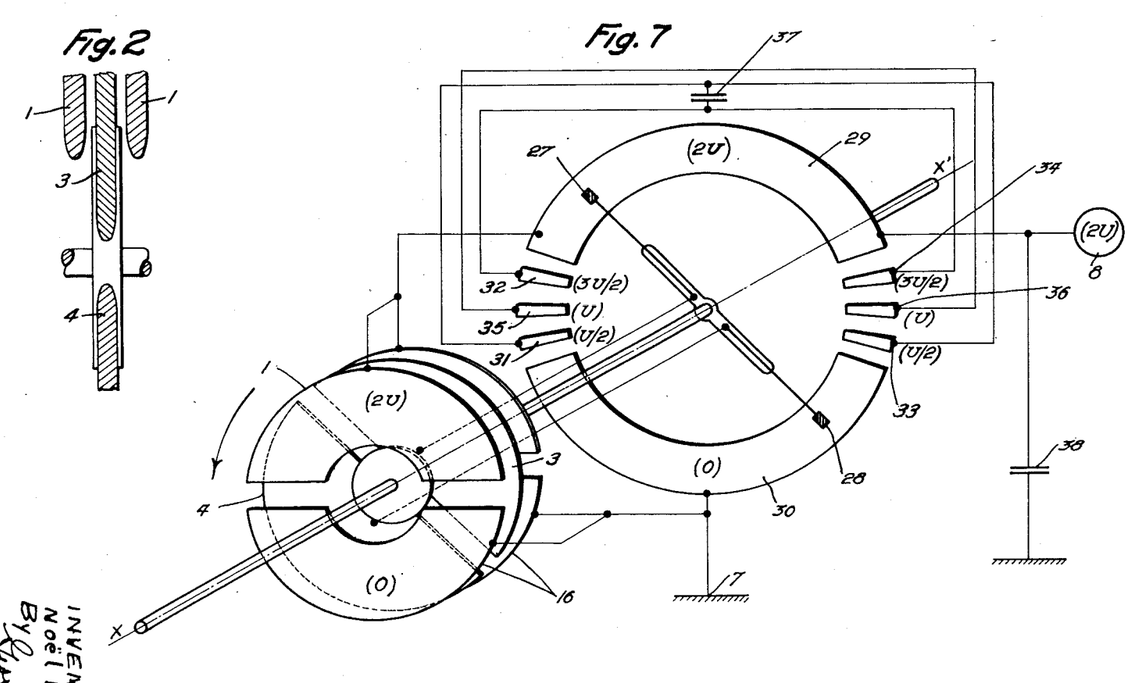
Fig. 2 is a cross section on line 2—2 of Fig. 1.
Fig. 7 shows a modification of the machine and system of Fig. 6.

The machine shown in Fig. 1 essentially comprises an inductor 1 formed of relatively thick metal plates the edges of which, as shown in Fig. 2, have a cross section in the form of an elongated curve merging tangentially with the lateral faces of the plate, this inductor being brought to the potential $-U$ by connection to the source 2, two conveyors 3 and 4 of the same cross sectional form as the inductor mounted on a rotatable shaft, and two brushes 12 and 13 bearing against collector rings 10 and 11 carried on this shaft. In prior art machines of this type the first brush 12 would be grounded and, therefore, at the potential zero while the second brush 13 would be connected directly to the insulated or output terminal 8 of the machine which is at the potential $+U$. The conveyors would be connected to respective commutator segments carried by the shaft to make contact with the brushes in proper relation to the movement of the conveyors into and out of inductive relation to the inductor 1 so as to develop the charge and discharge it to the output terminal.

The maximum potential difference developed between inductor and conveyor by their relative movement then would be $2U$. When one of the conveyors, the conveyor 3 for example, rotating in the direction of the arrow, begins to move out of full registering inductive relation to the inductor 1 its potential still would be 0 and the instantaneous work of the resistant electrostatic force of reaction taken at the center of gravity of the main frame area is $$\tfrac{1}{2}U^2 \tfrac{dc}{d\alpha}, \tfrac{dc}{d\alpha}$$

being the variation of the capacity between inductor and conveyor per unit of angle of rotation. If the conveyor were, at the very beginning of the movement, at the potential $+U$ instead of at zero potential this force would be $$2U^2 \frac{dc}{d\alpha}$$

i. e. quadruple the force if the conveyor were maintained at zero potential. This would result in an increase of the reaction work of the electrostatic forces and this increase would manifest itself through a doubling of the current output. Indeed, the initial charge of the conveyor would be $2CU$ instead of $CU$ ($C$ being the maximum capacity between inductor and conveyor). The power thus would be doubled.

For obtaining the above mentioned improved conditions the conveyor 3 could be connected to a generator giving the potential $+U$, or to the load itself if this load had sufficient capacity for yielding the additional charge to the conveyor. However, this method would have two serious disadvantages:

(a) If the conveyor with the potential 0 were suddenly connected to a conductor at the potential $+U$ a strong spark would be produced which would result in the dissipation of the energy $\frac{1}{2}CU^2$ to no useful purpose, with attended deterioration of the contacts.

(b) If the connection were established with the load, the gain of power would be zero. The initial charge of the conveyor is still $2CU$ but, since the supplement charge $CU$ is supplied by the load, the load supplies the energy $CU^2$ to the machine and the machine will merely return this charge to it during the output period. The sole result of the operation is simply that a spark is produced dissipating energy $\frac{1}{2}CU^2$ which must be supplied by the driving motor.

It may thus be seen that sudden connection as above described leads to no progress whatever.

In the case of static electricity two conductors at different potentials should not be put into connection with each other. A change of potential can be obtained, however: (a) through leaving the conveyor in an insulated condition, which is the case in all the known machines; (b) through putting the conveyor into connection in succession with a theoretically infinite number of sources of electricity the successive potentials of which would differ only by infinitesimal degrees.

Fig. 1 shows a machine in accordance with the invention meeting the above conditions and in which nine auxiliary generators are used in order progressively to raise the potential of the conveyors. The two collector rings 10 and 11 are connected to the conveyors 3 and 4 respectively. Brushes 12 and 13 sliding on said rings themselves are connected to the contact arms 14 and 15 of two commutating devices comprising respectively the series of contact studs $P_0$ to $P_{10}$ and $q_0$ to $q_{10}$ in number in each series equal to the number of the auxiliary generators plus two additional contacts one of which is connected to the insulated terminal of the machine while the other is grounded. The contact studs $P_1$ to $P_9$ and $q_1$ to $q_9$ are connected respectively to the auxiliary generators $G_1$, $G_2$ ... $G_9$ giving stepped potentials comprised between 0 and $U$, i. e.:

$$U/10, 2U/10, 3U/10 \ldots 9U/10$$

The operation of the machine is as follows. When the conveyor 3 is in the position of full inductive relation to the inductor 1 its movement is stopped and it is connected to ground through the ring 10 and brush 12, the commutator contact arm 14 being in engagement with the contact $P_0$. With movement of the conveyor 3 thus arrested the contact arm 14, actuated by suitable driving means represented in Fig. 1 merely diagrammatically and by the dot and dash line connecting the shaft of the machine to the arms 14 and 15, is moved from contact $P_0$ successively to contacts $P_1$, $P_2$, $P_3$, etc. The potential of the conveyor thereby is raised in steps to those given in the series above and as indicated in the drawing for the respective generators. Movement of the arm 14 is continued into engagement with the contact $P_{10}$ connected to the insulated or output pole 8 of the machine, the potential of this pole being $+U$. The charge carried by the conveyor thereby is not delivered to the load because the potentials of the conveyor and load are the same.

The movement of conveyor 3 between the inductors 1 then is resumed and the charge begins to be delivered to the load as the potential of the conveyor tends to rise until when the conveyor 3 is fully out of inductive relation to the inductor 1 the charge of $2CU$ at potential $+U$ will have been delivered to the load circuit. This charge would be only $CU$ if the potential of the conveyor 3 at the start of its movement out of full inductive relation to the inductors were 0 as heretofore practiced instead of $+U$ in accordance with this invention.

When the conveyor 3 has entirely moved out of inductive relation to the inductor 1, it is brought back to the potential 0 by shifting the commutator 14 in the reverse direction to disconnect the conveyor from the terminal 8 and to connect it to ground through the contact $P_0$. The conveyor then is moved again into inductive relation to the inductor while remaining in connection with ground until the capacity between the conveyor and the inductor 1 is at maximum when the conveyor 3 fully registers with the inductor 1. The cycle described then is repeated. The commutator 15 effects the change of connections of the conveyor 4 to ground and to the load terminal and to the generators in a similar manner.

In the description of the operation of the preceding machine, as well as in that set forth hereinafter with reference to Figs. 3 and 4, it is assumed that the movement of the conveyors is intermittent, this movement being interrupted during the time which is necessary for effecting the concentrated and accelerated commutation.

In practice, in order to avoid the drawbacks inherent in such a periodical stopping of the movement of the machine, its rotation is kept continuous and the commutator arms 14 and 15 are then arranged to move over the studs $P_0$ to $P_{10}$ or $q_0$ to $q_{10}$ and the reverse paths at a very high speed with respect to the speed of rotation of the conveyors, so that the accelerated commutation takes place while the corresponding conveyor covers only a small fraction of its course.

Generally, the operation of the machine is the better the more numerous the generators $G$ are. However, in practice a comparatively restricted number of generators, three or five for instance, is sufficient for greatly improving machines which do not have the means of the invention.

In the preceding example the conveyors moving out of inductive relation to inductor 1 bring a charge $2CU$ to the outer circuit but, on the other hand, they receive only a charge $CU$ from the earth. The difference is supplied by the generators G. The electric power supplied by the machine to the outer circuit is not entirely due to the work of the motor which drives the machine and a part of this power comes from the generators G themselves. If it is desired that the generators merely fulfill a function of commutation without supplying any appreciable power, this may be accomplished by a simple modification of the machine of Fig. 1.

Figure 3:
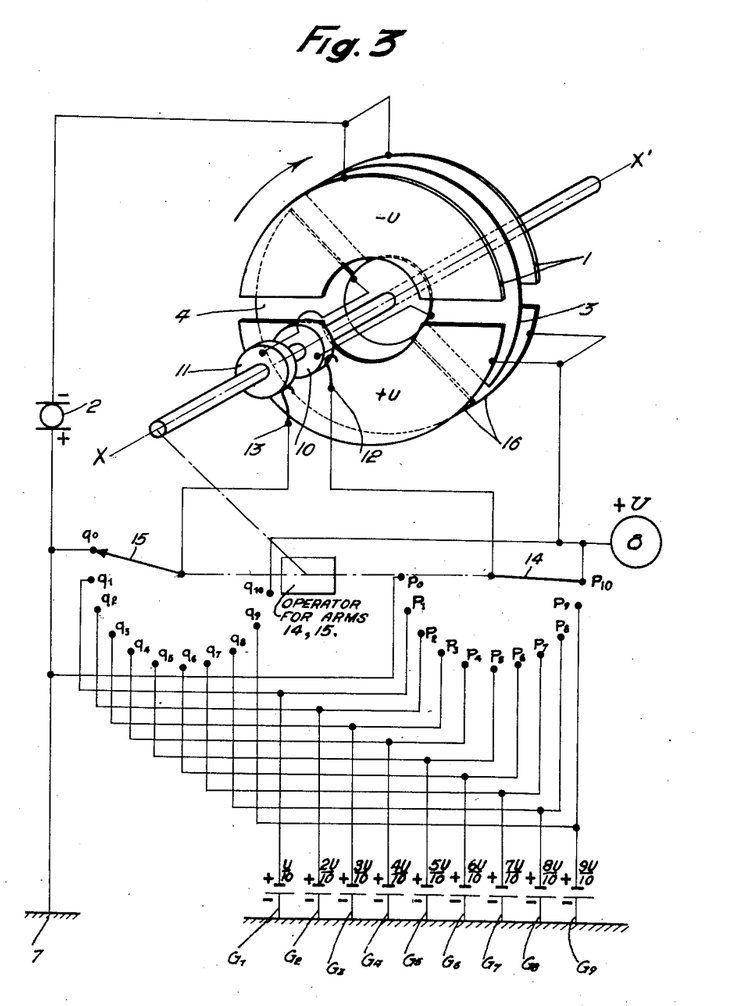
Fig. 3 shows an arrangement similar to that of Fig. 1, in which no energy, except that to supply the losses, is taken from the auxiliary sources.

Fig. 3 shows such a modification which consists in adding a screen inductor 16 similar to the inductor 1 and brought to the voltage $+U$. It will be seen that when the machine is operated as above described a conveyor 3 or 4 connected to ground through contacts $P_0$ or $q_0$ has a charge $-CU$ when it begins to enter inductive relation to the inductor 1. It receives, therefore, from the earth a charge $2CU$ instead of $CU$ which it would receive if the screen 16 were not present and the generators G were not used. Thus, the generators G do not supply electricity to the load circuit in the embodiment of Fig. 3 and all the electric power generated is drawn from the motor driving the shaft which carries the conveyors 3, 4.

In the above described embodiments of the invention, as in the following ones, the commutation is effected by means of mechanical commutators with contact studs, which commutators may be driven either directly by the machine itself or by independent means synchronizd with the machine. It will be understood that within the scope of the invention this commutation may be effected by any other known means which may be suitable to accomplish accelerated commutation as described, the design and construction of these various commutating and driving means themselves being independent of the invention proper and within the knowledge of any man skilled in the art.

It is to be noted that it is expedient, in spite of the variation of the charge of the conveyors, that during the accelerated commutation effected in accordance with the invention the potential of the inductors shall not vary greatly. It will be advantageous, for example, permanently to connect these inductors to condensers of a sufficient capacity to reduce these variations to an acceptable magnitude for the intended uses of the machine.

It will be possible also to use generators or sources of electricity of any desired type provided they can supply to the conveyors (or receive from them) the required quantity of electricity within the shortest possible time. Accordingly, their own resistance and inductance should have the smallest possible values consistent with practical and economical construction.

When the average power supplied by the sources is zero, as in most cases, the generators described above may be replaced by simpler devices which are then entirely equivalent to them. The nine generators of Fig. 3 may be replaced, for instance, by nine condensers the insulating resistance and the capacity of which are sufficiently high with respect to the maximum capacity between the inductor and the conveyor so that the condensers substantially keep their charge in the course of a cycle of commutation of the connections.

Figure 4:
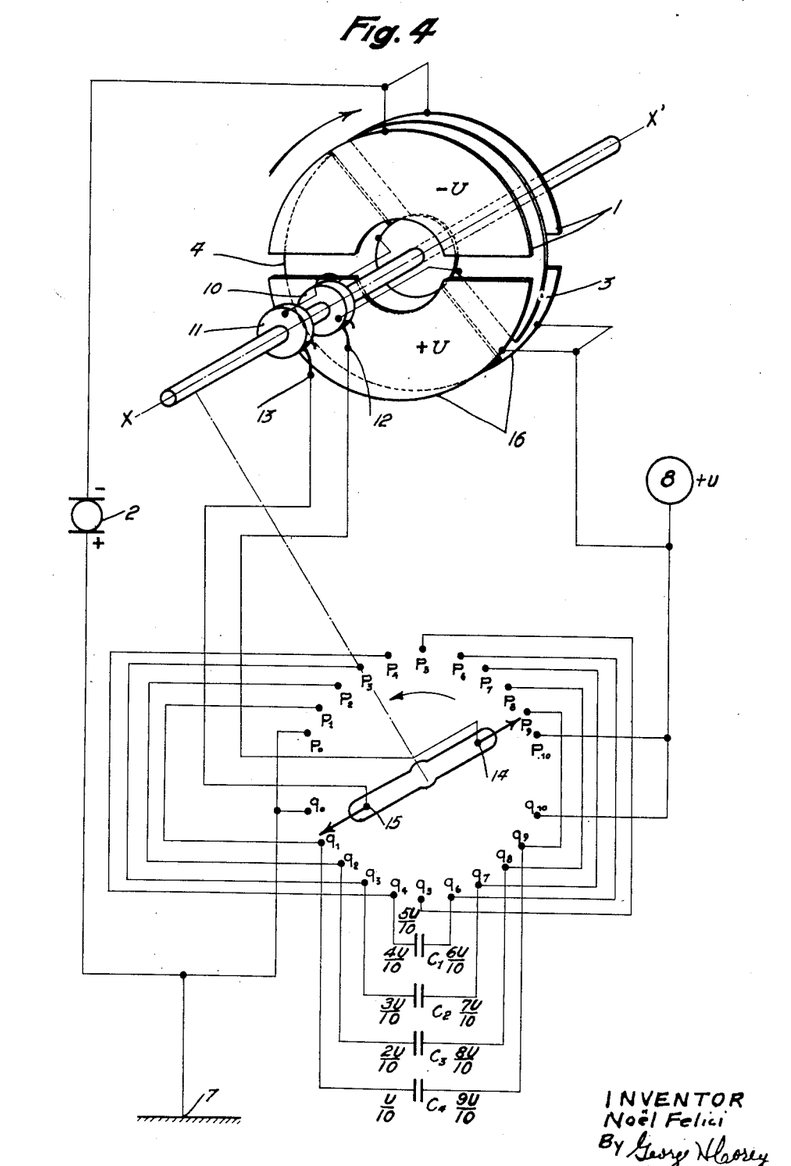
Fig. 4 shows an embodiment in which the auxiliary sources are represented by condensers.

Fig. 4 shows a machine in which the auxiliary generators are replaced by condensers the number of which through an appropriate coupling has been reduced from nine to four. It may be seen that two conveyors are commuted simultaneously and jointly.

In the embodiment of Fig. 4 the conveyor 3 which is connected to the ring 10 discharges to the insulated or output terminal 8 through the contact arm 14 when this arm engages the contact $P_{10}$, while the conveyor 4 which is connected to the ring 11 receives a positive charge from the earth through the brush 13 when the arm 15 engages the contact $q_0$ and these connections are maintained until the conveyor 3 has moved entirely out of inductive relation to the inductor 1 and the conveyor 4 entirely out of inductive relation to the inductor 16. At this moment the discharge from conveyor 3 and the charge of the conveyor 4 are completed and conveyor 3 carries a charge 0 and conveyor 4 carries a charge $+CU$.

In normal operation the potentials of the contacts $P_1, P_2 \ldots P_9$ and $q_1, q_2 \ldots q_9$ are respectively equal to $U/10, 2U/10, \ldots 9U/10$ provided that the capacities of the condensers $C_1, C_2, \ldots C_4$ connected to these contacts, as shown in Fig. 4, are distinctly higher than the maximum capacity between an inductor and conveyor which is designated by C.

Since the discharge of the conveyor 3 and the charge of the conveyor 4 now have been completed, as mentioned above, the movement of the conveyors is stopped in order to effect the accelerated commutation.

By movement of the arms 14, 15 in the counterclockwise direction, Fig. 4, the conveyor 4 will now be put into connection with the contact stud $q_1$, while the conveyor 3 will be connected to the contact $P_9$. Then conveyor 4 is put into connection with contact $q_2$, and conveyor 3 with $P_8$, and so on. Thus, the potential of the conveyor 4 will be raised by degrees from $U/10$ to $9U/10$, while that of the conveyor 3 will be lowered according to the same progression down to $U/10$. Each of the condensers $C_1$ to $C_2$ receives and then returns the charges $CU/10$. When the contact arm 14 has reached $P_1$ and the arm 15 has reached $q_9$, the accelerated commutation is achieved. The charge of the conveyor 4 is $2CU-CU/10$, and that of the conveyor 3 is $-CU+CU/10$. The fact that the number of condensers used in this particular embodiment is not infinite results in a loss of $\frac{1}{10}$ with respect to the theoretically maximum charge possible in accordance with the invention.

As the accelerated commutation is completed the arm 14 comes into engagement with contact $P_0$ and the arm 15 with contact $q_{10}$. The movement of the conveyors then recommences. Conveyor 4 supplies its charge $2CU-CU/10$ to the insulated pole or output terminal 8 under the potential $+U$, while conveyor 3 yields its charge $-CU+CU/10$ to ground and receives a charge $+CU$ from the same.

According to another embodiment of the invention all of the auxiliary generators (or other auxiliary sources of electricity) may be replaced by an inductance coil or other electrically equivalent device forming an oscillatory circuit with the two conveyors. Such a coil behaves, at any moment, like a generator the electromotive force of which exactly balances the difference of potential which is applied to it.

Figure 5:
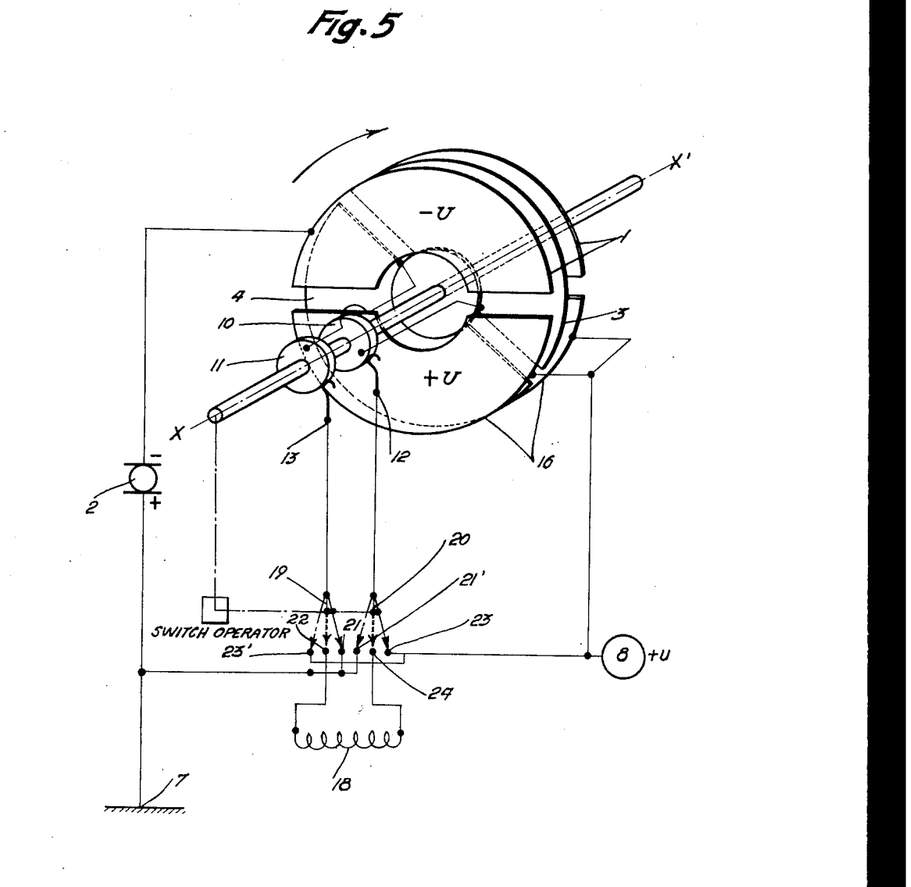
Fig. 5 relates to an embodiment in which the auxiliary source is provided by an oscillatory circuit the period of which is matched with the characteristics of the condenser formed by the inductor and conveyor of the machine.

Fig. 5 is a diagrammatical view of a largely simplified embodiment of this variant in which in a machine of the type of Fig. 1 the two conveyors 3 and 4 are periodically connected with the two ends of the inductance coil 18 by means of a double mechanical commutator 19—20 the movement of which is effected by a suitable driving connection to the rotor rotating on axis XX'. The commutating device 19—20, of course, could be replaced, as mentioned above, by any other commutating device actuated through the rotation of the machine or controlled by the difference of potential in this case between the brushes 12 and 13.

The operation of the machine built in accordance with Fig. 5 is as follows:

In a first position in which the arms 19 and 20 of the commutation device together are pushed to the position at the right, as shown in full lines in Fig. 5, the conveyor 3 is connected through the brush 12, the arm 20 and the contact 23 with the insulated output terminal 8 of the machine to which it yields its charge under the potential $+U$. The conveyor 4 at the same time is connected through the brush 13, the arm 19, also in the right hand position, and the contact 21 with ground from which it receives a positive charge.

When the conveyor 3 has entirely moved out of inductive relation to the inductor 1 and the conveyor 4 entirely out of inductive relation to the inductor 16, the commutating device is moved and the arm 19 comes into contact with 22 and the arm 20 into contact with 24 in the dotted positions shown in Fig. 5. The conveyors 3 and 4 thus are connected in a sudden manner to the ends of the coil 18 and form an oscillatory circuit therewith. Since the current is zero at the initial moment, under the action of the difference of potential which exists between 3 and 4 at the beginning a more and more intense current will build up in the coil 18, until all the electrostatic potential energy which is available between 3 and 4 is converted into magnetic energy in the magnetic field of the coil 18. At the end of one quarter of the period of the oscillation the potentials of 3 and 4 are thus made equal but, since the current continues to flow through the coil 18 on account of its inductance, the potential of conveyor 4 then will become positive and that of conveyor 3 negative. If the electrical losses of the coil 18 itself are sufficiently small, the current will cease when the potential of conveyor 4 will have become equal to $+U$ and that of conveyor 3 to zero. At this moment the commutating device is moved to the dot and dash position at the left in Fig. 5 so that the arm 19 will come into contact with 23', thus putting conveyor 4 into connection with the insulated terminal 8, while the arm 20 will come into contact with 21', thus putting conveyor 3 into connection with ground. The conveyor 4 will transfer its charge to the output terminal 8, while 3 will transfer its charge $-CU$ to the earth and receive a charge $+CU$ from the same. When the conveyors 3 and 4 again are in register respectively with inductors 1 and 16 the arms 19 and 20 are returned to the dotted line position and the cycle is repeated.

Figure 6:
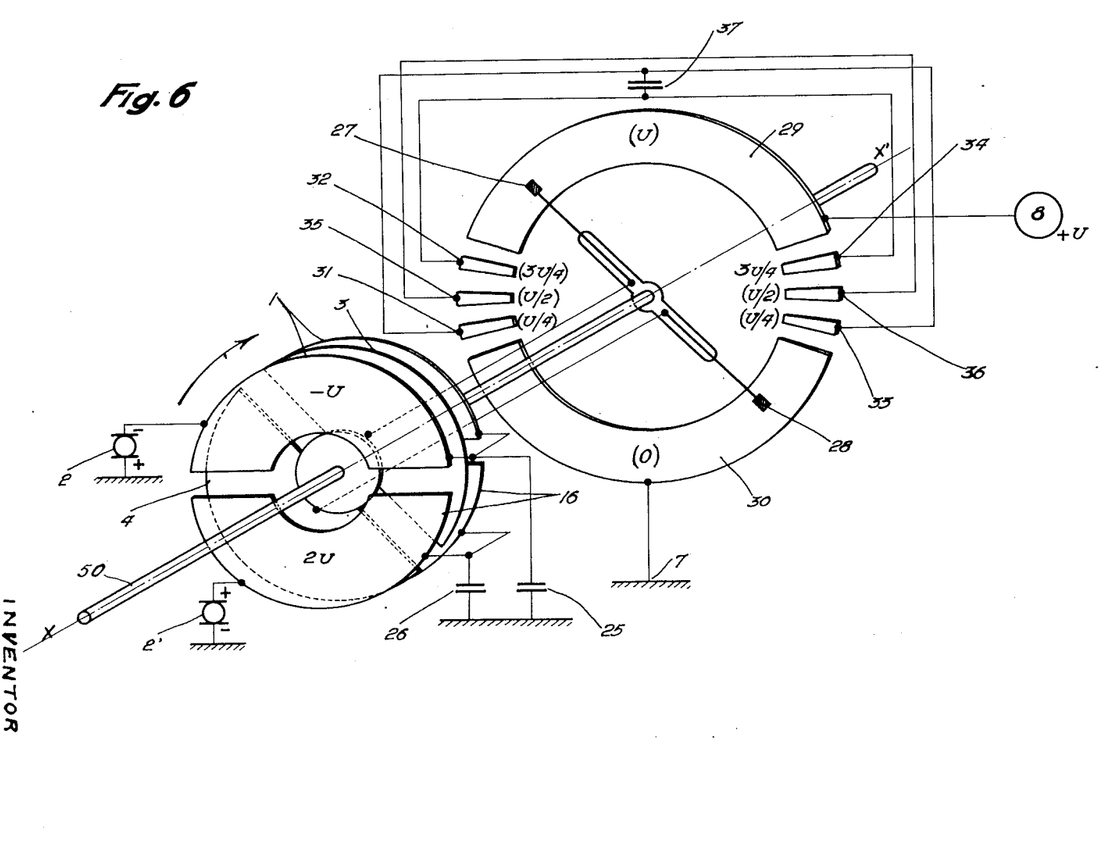
Fig. 6 shows a machine of the Toepler type in which the means used in accordance with the present invention are combined with means which make it possible to increase considerably the output power of the machine.

Fig. 6 shows very diagrammatically an embodiment of a machine such that its output power is considerably increased with respect to the conventional Toepler machine. The members which play the same parts as in the above described embodiments are indicated by the same reference numerals. The two inductors 1 and 16 which are maintained at the potentials $-U$ and $+2U$ by two auxiliary sources of electricity 2 and 2' are connected with the respective plates of two condensers 25 and 26 the other plates of which are connected to ground. The capacity of these condensers is sufficiently high with respect to the maximum capacity between an inductor and a conveyor so that the potentials of the respective inductors remain practically constant during the accelerated commutation of the conveyors in spite of the resulting variation of the charges thereon. Two conveyors 3 and 4 carried by shaft 50 and rotatable therewith are connected respectively to brushes 27 and 28 insulated from each other and rotatable with the shaft 50, these brushes being disposed 180° apart about the axis of the shaft. These brushes rotate with the conveyors 3 and 4 and slide on fixed contacts in order to effect the accelerated commutation and the connection with the terminals of the machine. Two fixed contacts, 29 and 30, cover each an angle of about 160°. The contact 30 is connected to ground at 7 and the other contact 29 is connected to the insulated output terminal 8 of the machine at potential $+U$. The other contacts six in number, 31 to 36, are comparatively very narrow with respect to the contacts 29 and 30 and are separated by insulating gaps which serve for the accelerated commutation. The contacts 31 and 32 respectively, as well as the contacts 33 and 34 respectively, are connected to the plates of a condenser 37, as shown in Fig. 6. The middle contacts 35 and 36 are merely connected together.

The operation of this machine of Fig. 6 is as follows:

In the position which is represented the conveyor 3 which is connected to the brush 27 is discharging to the insulated or output terminal 8 of the machine under the decreasing influence of the inductor 1 and the increasing influence of the inductor 16, the potential of terminal being $+U$. The conveyor 4 which is connected to the brush 28 begins to come under the influence of the inductor 1 so as to increasingly receive a positive charge from the earth.

During further rotation of the machine in the clockwise direction shown the brushes 27 and 28 leave the contacts 29 and 30 simultaneously. The discharge of the conveyor 3 and the charge of the conveyor 4 are completed, the conveyor 3 now carrying a charge $-CU$, and the conveyor 4 a charge $+CU$.

It may be shown that in normal operation the contacts 31 and 33 are at the potential $U/4$, the contacts 32 and 34 at a potential $3U/4$. When the brush 27 engages the contact 34 and the brush 28 engages the contact 31, the conveyor 3 is brought to the potential $3U/4$ and the conveyor 4 to $U/4$, the capacity of the condenser 37 being high with respect to the maximum inductor-conveyor capacity C. The condenser 37 receives a quantity of electricity $CU/4$ which it will return in the manner hereinafter explained.

Then the brush 27 comes into engagement with the fixed contact 36 and the brush 28 with the contact 35 and the potentials of both conveyors 3 and 4 become equal to $U/2$. An interchange of charge equal to $CU/4$ takes place between the two conveyors through the lead connecting contacts 35 and 36.

Finally, the brush 27 comes into engagement with the contact 33 and the brush 28 with the contact 32. The conveyor 3 thereby is brought to the potential $U/4$ and the conveyor 4 to $3U/4$. The condenser 37 returns the charge $CU/4$ which is previously received.

The accelerated commutation is then complete. The charge of the conveyor 3 is

−2CU+CU/4 and that of the conveyor 4 is 2CU−CU/4.

During the following movement of the conveyors the brush 27 engages the contact 30 and the brush 28 engages the contact 29. The conveyor 4 transmits its charge 2CU−CU/4 to the insulated terminal and then receives a charge −CU from the same owing to the influence of the inductor 16. Likewise, the conveyor 3 transmits its charge −2CU+CU/4 to ground and then receives a charge +CU from the ground owing to the influence of the inductor 1 and the cycle can begin again.

Fig. 7 shows a variant of the above described machine. This variant offers practical advantages of considerable importance which consist in the elimination of all exciting devices, the machine being self-exciting, and in the fact that the maximum potential difference to be insulated in the machine is merely equal to the delivered voltage instead of being the double or the triple the same. This renders possible interesting applications, more particularly for machines having a comparatively high voltage.

The components of the machine itself are exactly the same as in the embodiment of Fig. 6 and are indicated by the same reference numerals but the connections are different as regard the inductors. Instead of being maintained at a particular potential by means of an auxiliary source, as is necessary in all the machines which have been described above, the inductors in the embodiment of Fig. 7 are connected to the respective terminals of the machine, that is, to ground and to the insulated output terminal assumed to be at the potential 2U. A condenser 38 is connected between this output terminal and ground, the capacity of this condenser being high enough so that the potential difference between its plates does not vary to any substantial extent in the course of a cycle of commutation.

The machines of Figs. 6 and 7 have the same cycle of operation. The machine of Fig. 7 differs from that of Fig. 6 in that the main inductor 1 is connected to the contact 29 and to the output terminal 8 so as to be maintained at the same potential as this terminal taken as 2U in Fig. 7, whereas in Fig. 6 this inductor is maintained at a negative potential −U. Fig. 7 differs further in that the screen inductor 16 is connected to the contact 30 and to ground, whereas this screen in Fig. 6 is maintained at a potential +2U, that is, above the potential +U of the output terminal 8. Accordingly the contacts 31 to 36, as indicated in Fig. 7, have the potentials U/2, U and 3U/2, the potential difference between the condenser plates 37 being U instead of U/2 as in Fig. 6.

When a conveyor, for example the conveyor 3 in Fig. 7, in moving out of inductive relation to the inductor 16 has ceased to discharge to the output terminal 8, that is, when it has moved almost into full inductive relation to the inductor 1 at potential +2U, its charge is zero because it is then connected to this terminal at potential +2U through the contact 29. It is then brought back to the potential U/2 in three steps by engagement of brush 27 moving counterclockwise, as shown in Fig. 7, over contacts 32, 35 and 31 in succession and then into engagement with the contact 30. It thus acquires a charge of −3CU/2 which it transmits to ground. When a conveyor is in full inductive relation to the inductor 16 which is connected to ground its charge is zero since the conveyor also is at ground potential and connected to the inductor 16, as is the conveyor 4 in Fig. 7 through the brush 28 and the contact 30. As the conveyor moves out of full inductive relation with the inductor 16 it is brought to the potential 3U/2 in three steps by movement of the brush connected thereto, for example, the brush 28 in Fig. 7, over the contacts 33, 36 and 34 in succession. It, therefore, acquires a charge of 3CU/2 which it will transmit to the output terminal when the brush engages the contact 29. It is apparent in the apparatus of Fig. 7 that these operations take place simultaneously with respect to the two conveyors, the condenser 37 receiving and then returning the charge 1CU/2.

Although in the above described examples in order to facilitate the explanation of the features of the invention electric generators only were considered, it should be understood that the means shown and described may be used without modification for electrostatic motors having conductive inductors and conveyors. In addition to the increase of power which the invention brings about as described above, it is possible to design and build electrostatic motors offering the advantage of a driving torque which is constant except for the very short periods in which the accelerated commutation takes place. When operating as a motor the machine of Fig. 7 has, moreover, the advantage that it gives its maximum torque from the very moment of the application of the voltage without it being necessary to use an exciter.

What I claim is:

1. In electrostatic apparatus, the combination with an electrostatic machine having a conductive inductor and a conductive conveyor, said inductor and conveyor being supported for movement of one relative to the other into and out of full inductive relation to each other, and means connected to said inductor for maintaining said inductor at a predetermined potential, of means operatively connected to said conveyor for progressively increasing the potential of said conveyor from a given potential to a predetermined potential substantially in the position of said conveyor in which it is in full inductive relation to said inductor, and means for maintaining said conveyor at said predetermined potential during movement of said conveyor from said position of full inductive relation to a position fully out of inductive relation to said inductor and for discharging said conveyor at said predetermined potential when connected to a load.

2. In electrostatic apparatus the combination with an electrostatic machine having a conductive inductor and a plurality of conductive conveyors, said inductor and said conveyors being supported for movement of said inductor and conveyors relative to each other to bring said conveyors in succession into and out of full inductive relation to said inductor, and means connected to said inductor for maintaining said inductor at a predetermined potential, of means operatively connected to said conveyors for progressively increasing the potential of said conveyors from a given potential to a predetermined potential respectively substantially in the position of said conveyors in which they are in full inductive relation with said inductor, and means for maintaining the respective conveyors in succession at said predetermined potential during movement of the respective conveyors out of full inductive relation to said inductor and for discharging the respective conveyors at said predetermined potential when connected to the load.

3. In electrostatic apparatus the combination with an electrostatic machine as defined in claim 1, said inductor and conveyor each having a substantial extent of face surface and being supported with said surfaces generally parallel to each other and for movement of one relative to the other into and out of said inductive relation to each other in the direction parallel to said face surfaces thereof.

4. In electrostatic apparatus the combination as defined in claim 3 in which said inductor and conveyor each have a substantial thickness perpendicular to said face surfaces thereof and each are provided along the edges of said face surfaces with edge surfaces that are profiled along a curve merging tangentially with said face surfaces thereof and convex respectively with respect to said inductor and conveyor.

5. In electrostatic apparatus, the combination as defined in claim 1 which comprises an auxiliary conductive inductor member supported in relation to said conveyor for movement of said auxiliary inductor and said conveyor one relative to the other into and out of full inductive relation to each other, said auxiliary inductor being electrically connected to the load terminal of said electrostatic machine, and means for connecting said conveyor to said load terminal in said position fully out of inductive relation to said auxiliary inductor.

6. In electrostatic apparatus, the combination with an electrostatic machine having a pair of conductive inductors and a pair of conductive conveyors, said inductors and conveyors being supported for movement of said inductors and said conveyors relative to each other to bring said conveyors in succession into and out of full inductive relation to each of said inductors in succession, two series of contacts disposed in a predetermined order with respect to each other in each series and with the series in opposed relation to each other, homologous contacts being electrically connected together to be respectively at the same potentials, a pair of contact members respectively adapted for movement over the contacts of the respective series in order and oppositely in one series relative to the other with respect to said homologous contacts, and a plurality of condensers respectively connected between the electrically connected contacts at the two ends of said series and between the contacts of said series next to said end contacts and between the respective next adjacent contacts in succession of said two series, a pair of contacts respectively adjacent the opposed ends of said two series and adapted to be engaged respectively by said contact members after passing over each of said series, said pair of contacts respectively being maintained at a predetermined potential and at the potential of the load terminal of the machine different from said predetermined potential.

7. In electrostatic apparatus, the combination with an electrostatic machine having a conductive inductor and a plurality of conductive conveyors, said inductor and said conveyors being supported for movement of said inductor and conveyors relative to each other to bring said conveyors in succession into and out of full inductive relation to said inductor, and means connected to said inductor for maintaining said inductor at a predetermined potential, of an induction coil, a pair of three position switches, means providing continuous electrical connection of the movable contact members of said switches respectively to said conveyors, the middle fixed contacts of said switches respectively being connected to the ends of said induction coil, two outer fixed contacts of said switches being connected together and to the output terminal of the machine, the other two outer fixed contacts of said switches being connected together and to means for maintaining said other outer contacts at a given potential different from the potential of said output terminal, and means for moving said two contact members together respectively into engagement with the fixed contacts connected to said output terminal and the fixed contacts at said given potential in one of the outer contact positions of the respective contact members and into engagement with the fixed contacts at said given potential and said contacts connected to said output terminal in the other outer contact positions of said contact members.

8. In electrostatic apparatus, the combination with an electrostatic machine having a pair of conductive inductors and a pair of conductive conveyors, said inductors and said conveyors being supported for movement of said inductors and conveyors relative to each other to bring said conveyors in succession into and out of full inductive relation to said inductors in succession, and means connected to said inductors for maintaining said inductors respectively at predetermined potentials one higher than the other, of a pair of condensers respectively connected between said inductors and a member maintained at a predetermined potential intermediate between said two predetermined potentials of said inductors, means operatively connected to said conveyors for progressively increasing and decreasing the potentials of each conveyor in succession between a given lower potential and a given higher potential substantially in the positions of said conveyors in which they are in full inductive relation respectively to said inductors of lower and higher potential, means for maintaining said conveyors in succession at said higher and given potentials during movement of said conveyors from said positions of full inductive relation respectively to said inductors of lower and higher potential to positions fully out of said inductive relations, and means for connecting each conveyor at higher potential to the load terminal of the machine and for connecting the other conveyor to said member during said movement of said conveyors out of full inductive relation to said inductors.

9. In an electrostatic apparatus, the combination with an electrostatic machine having a conductive inductor and a plurality of conductive conveyors, said inductor and said conveyors being supported for movement of said inductor and conveyors relative to each other to bring said conveyors in succession into and out of full inductive relation to said inductor, and means connected to said inductor for maintaining said inductor at a predetermined potential, of a pair of elongated contact elements disposed in opposed generally parallel relation to each other and respectively connected to the load terminal of the machine and to ground, opposite ends of one of said contact elements being adjacent but in spaced relation to the respective opposite ends of the other contact element, a plurality of relatively narrow contact segments disposed in spaced relation to each other between and in spaced relation to the respective adjacent ends of said elongated contact elements, the contact segments that are homologous with respect to the ends of each of said elongated contact elements being electrically connected together, a pair of contact members respectively electrically connected to said conveyors and supported for movement concomitantly with said conveyors in contact with the respective elongated contact elements in succession in opposite directions with respect to the adjacent ends of said elongated contact elements and in contact with said narrow segments in the movement from one elongated segment to the other at said adjacent ends, and a condenser connected between two sets of said homologous connected narrow contact segments.

10. In electrostatic apparatus, the combination as defined in claim 9 in which said elongated elements are of arcuate form, said pair of contact members being supported for rotation on an axis to bring said members in succession into contact with said arcuate contact elements and into contact with said narrow contact segments disposed between adjacent ends thereof in passing from one contact element to the other at each end thereof.

11. In electrostatic apparatus, the combination with an electrostatic machine having a conductive inductor and a plurality of conductive conveyors, said conveyors being supported for rotation thereof upon an axis to bring said conveyors in succession into and out of full inductive relation to said inductor, means connected to said inductor for maintaining said inductor at a predetermined potential, of a pair of elongated arcuate contact elements disposed circumferentially about said axis with the adjacent ends thereof respectively spaced apart, a plurality of narrow contact segments disposed in spaced relation to each other in each of the spaces between the adjacent ends of said arcuate elements, a plurality of contact members respectively connected to said conveyors and supported for rotation with said conveyors on said axis and for contact in succession with said elongated arcuate elements and also with said narrow contact segments in succession that are in the spaces between the said arcuate elements, one of said arcuate elements being connected to the load terminal of the machine and the other arcuate element being connected to ground, the centrally disposed narrow contact segments in the respective spaces between said arcuate element being connected together, the homologous segments at a given side of the diameter through said central segments and said axis respectively being electrically connected together, the homologous segments at the opposite side of said diameter also respectively being connected together, and a condenser connected between connected homologous segments that are at opposite sides of said diameter.

12. In electrostatic apparatus, the combination with an electrostatic machine provided with a conductive inductor having a substantial extent of face surface and with a conductive conveyor having a substantial extent of face surface, said inductor and conveyor being supported with said face surfaces generally parallel to each other and for movement of one relative to the other into and out of full inductive relation to each other in the direction parallel to said face surfaces thereof, means connected to said inductor for maintaining said inductor at a predetermined potential, a plurality of generators adapted to develop at their respective terminals different predetermined progressively higher potentials, a plurality of contacts respectively connected to the terminals of said generators that are at said different potentials, a contact member connected in circuit with said conveyor and operatively connected to said conveyor so as to be brought in succession into engagement with said plurality of contacts substantially at the position of said conveyor in full inductive relation to said inductor to connect said conveyor in succession to said terminals of said generators at said different potentials in said progressively higher order, and a contact connected to the load terminal of the machine and adapted to be engaged by said contact member after engagement of said contact member with the contact connected to the terminal of highest potential of said generators to discharge said conveyor to the load.

13. In electrostatic apparatus, the combination as defined in claim 12 which comprises a contact adapted to be engaged by said contact member connected to said conveyor before engagement of said contact member with the contact connected to the terminal of lowest potential of said generators and connected in common to the other terminals of said generators.

14. In electrostatic apparatus, the combination as defined in claim 13 in which the number of contacts engaged by said contact member is greater by two than the number of generators, the terminals of said generators other than those at said predetermined potentials being connected to ground, one of said two additional contacts being connected to ground and the other being connected to the load terminal of the machine.

15. In electrostatic apparatus, the combination as defined in claim 9 which comprises an auxiliary conductive inductor member supported in relation to said conveyors for movement of said auxiliary inductor and said conveyors relative to each other to bring said conveyors in succession into and out of full inductive relation to said auxiliary inductor in spaced relation in said movement of said conveyors with respect to said first conductive inductor, said auxiliary inductor being connected to the load terminal of said electrostatic machine, said first inductor being connected to ground.

16. In electrostatic apparatus the combination as defined in claim 9 which comprises a condenser connected between said load terminal of the machine and ground.

17. In electrostatic apparatus the combination as defined in claim 7 which comprises means operatively connecting said switches to said conveyors for said movement of said movable contact members of said switches from a given one of said three positions thereof to the other positions thereof and return to said given position concomitantly with said movement of said two conveyors in succession into and out of full inductive relation to said inductor.

NOËL FELICI.

REFERENCES CITED

The following references are of record in the file of this patent:

UNITED STATES PATENTS

| Number | Name | Date |
| --- | --- | --- |
| 479,941 | Henry | Aug. 2, 1892 |
| 2,523,689 | Felici | Sept. 26, 1950 |